(12) United States Patent
Jang et al.

(10) Patent No.: US 11,545,727 B2
(45) Date of Patent: Jan. 3, 2023

(54) EASIER TO ASSEMBLE BATTERY MODULE INCLUDING BUS BAR FRAME

(71) Applicant: LG Chem, Ltd., Seoul (KR)

(72) Inventors: Kyung-Soo Jang, Daejeon (KR); Jae-Jung Seol, Daejeon (KR); Jun-Hee Jung, Daejeon (KR)

(73) Assignee: LG Energy Solution, Ltd.

( * ) Notice: Subject to any disclaimer, the term of this patent is extended or adjusted under 35 U.S.C. 154(b) by 317 days.

(21) Appl. No.: 16/769,484

(22) PCT Filed: Mar. 6, 2019

(86) PCT No.: PCT/KR2019/002619
§ 371 (c)(1),
(2) Date: Jun. 3, 2020

(87) PCT Pub. No.: WO2019/190072
PCT Pub. Date: Oct. 3, 2019

(65) Prior Publication Data
US 2020/0388814 A1     Dec. 10, 2020

(30) Foreign Application Priority Data

Mar. 30, 2018  (KR) ........................ 10-2018-0037066

(51) Int. Cl.
*H01M 50/502* (2021.01)
*H01M 10/48* (2006.01)
(Continued)

(52) U.S. Cl.
CPC ....... *H01M 50/502* (2021.01); *H01M 10/482* (2013.01); *H01M 50/20* (2021.01); *H01M 50/543* (2021.01); *H01M 2220/20* (2013.01)

(58) Field of Classification Search
CPC .. H01M 50/502; H01M 10/482; H01M 50/20; H01M 50/543; H01M 2220/20;
(Continued)

(56) References Cited

U.S. PATENT DOCUMENTS

2002/0121794 A1* 9/2002 Vejnar ................ B62D 33/0273
                                                          296/26.11
2007/0164525 A1* 7/2007 Rodrigues .......... A63B 71/0036
                                                          280/47.18
(Continued)

FOREIGN PATENT DOCUMENTS

CN          104979522 A      10/2015
CN          105264687 A       1/2016
(Continued)

OTHER PUBLICATIONS

Extended European Search Report including Written Opinion for Application No. EP19775189.4, dated Nov. 16, 2020, pp. 1-8.
(Continued)

*Primary Examiner* — Michael L Dignan
(74) *Attorney, Agent, or Firm* — Lerner, David, Littenberg, Krumholz & Mentlik, LLP

(57) ABSTRACT

A battery module includes a cell stack including stacked pouch-type secondary battery cells, which have electrode leads in opposite directions; a bus bar frame having first and second vertical plates and an upper plate connected to the first and second vertical plates to be hinged to at least one of the first and second vertical plates; and a mono-frame having a rectangular tube shape with an inner space in which the cell stack mounted to the bus bar frame is disposed. A plurality of bus bars are provided at outer surfaces of the first and second vertical plates, and the electrode leads of the cells are electrically connected to the corresponding bus bars through slots formed in the first and second vertical plates. A sensing member electrically connected to the bus bars of
(Continued)

the vertical plates to sense electrical characteristics of the cells is disposed at the upper plate.

12 Claims, 4 Drawing Sheets

(51) Int. Cl.
*H01M 50/20* (2021.01)
*H01M 50/543* (2021.01)

(58) Field of Classification Search
CPC ....... H01M 2010/4271; H01M 10/425; H01M 50/211; H01M 50/244; H01M 50/503; H01M 50/519; H01M 50/569; H01M 10/4207; H01M 50/531
See application file for complete search history.

(56) References Cited

U.S. PATENT DOCUMENTS

| | | |
|---|---|---|
| 2010/0190050 A1 | 7/2010 | Ochi |
| 2015/0285839 A1 | 10/2015 | Merriman et al. |
| 2016/0133890 A1 | 5/2016 | Lee et al. |
| 2016/0248070 A1 | 8/2016 | Ahn |
| 2018/0194235 A1 | 7/2018 | Kim et al. |
| 2018/0331336 A1 | 11/2018 | Choi et al. |
| 2019/0081363 A1 | 3/2019 | Brenner et al. |
| 2019/0348720 A1 | 11/2019 | Oh et al. |
| 2019/0389318 A1* | 12/2019 | Lee ................... H01M 50/20 |

FOREIGN PATENT DOCUMENTS

| | | |
|---|---|---|
| CN | 105552262 A | 5/2016 |
| DE | 102016103840 A1 | 9/2017 |
| JP | 2002157982 A | 5/2002 |
| JP | 2010176997 A | 8/2010 |
| JP | 2017021944 A | 1/2017 |
| JP | 2019508846 A | 3/2019 |
| JP | 2020504425 A | 2/2020 |
| JP | 2020514976 A | 5/2020 |
| KR | 20050032659 A | 4/2005 |
| KR | 20150050314 A | 5/2015 |
| KR | 20150109726 A | 10/2015 |
| KR | 20160048658 A | 5/2016 |
| KR | 20170066896 A | 6/2017 |
| KR | 20170094981 A | 8/2017 |
| KR | 20170141402 A | 12/2017 |
| KR | 101829350 B1 | 2/2018 |
| WO | 2017005345 A1 | 1/2017 |
| WO | 2017149144 A1 | 9/2017 |
| WO | 2017150807 A1 | 9/2017 |
| WO | 2018034382 A1 | 2/2018 |

OTHER PUBLICATIONS

International Search Report for Application No. PCT/KR2019/002619 dated Jul. 3, 2019, 2 pages.

Search Report dated Nov. 16, 2021 from the Office Action for Chinese Application No. 201980003071.8 dated Nov. 24, 2021, 3 Pages.

* cited by examiner

EASIER TO ASSEMBLE BATTERY MODULE INCLUDING BUS BAR FRAME

CROSS-REFERENCE TO RELATED APPLICATIONS

The present application is a national phase entry under 35 U.S.C. § 371 of International Application No. PCT/KR2019/002619, filed Mar. 6, 2019, which claims priority to Korean Patent Application No. 10-2018-0037066 filed on Mar. 30, 2018 in the Republic of Korea, the disclosures of which are incorporated herein by reference.

TECHNICAL FIELD

The present disclosure relates to a battery module, and more particularly, to a mono-frame type battery module having improved assembly by securing an efficient assembling structure and a surplus tolerance between components to be assembled.

BACKGROUND ART

A secondary battery capable of being charged and discharged is widely used as an energy source for a wireless mobile device. Also, the secondary battery is attracting attention as a power source for an electric vehicle (EV) and a hybrid electric vehicle (HEV), which are proposed as a solution for air pollution caused by existing gasoline and diesel vehicles using fossil fuels.

In smaller mobile devices, one or a few battery cells are used per device. However, middle-sized or large-sized devices such as a vehicle use a middle-sized or large-sized battery module in which a plurality of battery cells are electrically connected due to the need for high power large capacity, or a battery pack implemented by connecting a plurality of such battery modules.

In order for the middle-sized or large-sized battery module to provide the output and capacity demanded in a predetermined machine or device, a plurality of battery cells should be electrically connected in series, in parallel, or in both series and parallel, and should maintain a stable structure against an external force.

For example, the battery cells in the battery module may be welded to a plurality of bus bars, in which electrode leads are provided in the form of a metal plate, so as to be electrically connected thereto in series, in parallel, or in both series and parallel. In addition, the middle-sized or large-sized battery module may further include a sensing unit for sensing and controlling overvoltage, overcurrent, or overheating, which occurs at some battery cells.

Since the middle-sized or large-sized battery module is preferably manufactured to have as small size and weight as possible, the battery cells may be stacked with a high degree of integration. Also, rectangular cells and pouch-type cells having a small weight per capacity are frequently used as battery cells applied to the middle-sized or large-sized battery module.

Recently, a mono-frame type battery module is attracting attention as an example of the middle-sized or large-sized battery module that is compact compared to the energy density. The mono-frame type battery module is a battery module manufactured by mounting a bus bar and a sensing unit to a cell stack configured by stacking battery cells, and then accommodating them in a mono-frame provided in an integrated rectangular tube shape. The mono-frame type battery module mainly uses pouch-type battery cells which are very easily stacked.

However, since the pouch-type battery cells lack mechanical stiffness, in order to keep the cells to be stacked while being accommodated in the mono-frame, a supporting unit is needed to hold the pouch-type battery cells. The supporting unit may also be referred to as a stacking frame or a cartridge. However, if the supporting unit is used, the volume of the cell stack is increased, which is a negative factor in increasing the energy density.

In addition, in the case of a pouch-type battery cell having electrode leads protruding in opposite directions, bus bars are disposed at both sides of the cell stack for electrical connection and voltage sensing of each cell, and a plurality of wires are required to connect the bus bars spaced apart from each other. At this time, the utilization of the assembling space in the battery module is restricted due to the wire connection structure, and when an external impact is applied thereto, various events may be caused by a short circuit between the wires.

In consideration of the above issues, there is a demand to develop a battery module having a safe and space-efficient wire connection structure and a cell support structure capable of stably holding the cell stack without a stacking frame.

Meanwhile, in the case of the mono-frame type battery module, the assembly tolerance of and between components is minimized in order to maximize the energy density. In particular, the assembly tolerance is tightest when components of the battery module are being accommodated in the mono-frame. If the assembly tolerance is reduced as above, assembling becomes difficult in the production stage, leading to a decrease in production yield. Thus, there is a need for a design capable of securing a surplus assembly tolerance within the range that does not lower the energy density when the battery module is assembled.

DISCLOSURE

Technical Problem

The present disclosure is designed to solve the problems of the related art, and therefore the present disclosure is directed to providing a mono-frame type battery module, which may support a cell stack with a minimized number of components and have improved assembly and safety between the components to be electrically connected.

Also, the present disclosure is directed to providing a battery module, which may have improved assembly by securing a surplus assembly tolerance between the components including the mono-frame and the cell stack within a range that does not lower the energy density.

Technical Solution

In one aspect of the present disclosure, there is provided a battery module, comprising: a cell stack including stacked pouch-type secondary battery cells, which have electrode leads in opposite directions; a bus bar frame having first and second vertical plates respectively disposed at side surfaces of the cell stack corresponding to locations of the electrode leads of the cells and an upper plate connected to the first and second vertical plates and disposed at an upper portion of the cell stack to be hinged to at least one of the first and second vertical plates; and a mono-frame having a rectangular tube shape with an inner space in which the cell stack mounted to the bus bar frame is inserted and disposed, wherein a plurality of bus bars are provided at outer surfaces of the first and second vertical plates, and the electrode leads of the cells are electrically connected to the corresponding bus bars through slots formed in the first and second vertical plates, and wherein a sensing member electrically connected to the bus bars of the first and second vertical plates to sense electrical characteristics of the cells is disposed at the upper plate.

The bus bar frame may have stoppers formed at inner surfaces of the first vertical plate and the second vertical plate to protrude toward the cell stack, so that the stoppers come into contact with a lower surface of the upper plate when the bus bar frame makes a right angle with the upper plate.

One end of the upper plate may be connected to the first vertical plate by two hinges, another end of the upper plate may be connected to the second vertical plate by two hinges, and each stopper may be provided in the form of at least one rectangular plate located between the two hinges of the respective vertical plate.

The first vertical plate and the second vertical plate may respectively include assembling guide units convexly formed at an inner surface thereof at regular intervals along a stacking direction of the battery cells and extending along a height direction of the respective vertical plate.

Each stopper may be integrally formed with at least one of the assembling guide units of the respective vertical plate.

The sensing member may include a circuit board, and a cable for connecting the bus bars and the circuit board.

The upper plate may have a cable wiring groove concavely formed at a surface thereof to correspond to a width and a thickness of the cable along a wiring path of the cable.

The upper plate may have an opening vertically formed therethrough at a location adjacent to the cable wiring groove.

In another aspect of the present disclosure, there is also provided a battery pack, comprising the battery module described above.

In another aspect of the present disclosure, there is also provided a vehicle, comprising the battery pack. The vehicle may include an electric vehicle, a hybrid electric vehicle, a plug-in hybrid electric vehicle, and the like.

Advantageous Effects

According to an embodiment of the present disclosure, it is possible to provide a mono-frame type battery module, which may support a cell stack with a minimized number of components and have improved assembly and safety between the components to be electrically connected.

According to another embodiment of the present disclosure, it is possible to provide a battery module, which may have improved assembly by securing a surplus assembly tolerance between the components including the mono-frame and the cell stack within a range that does not lower the energy density.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
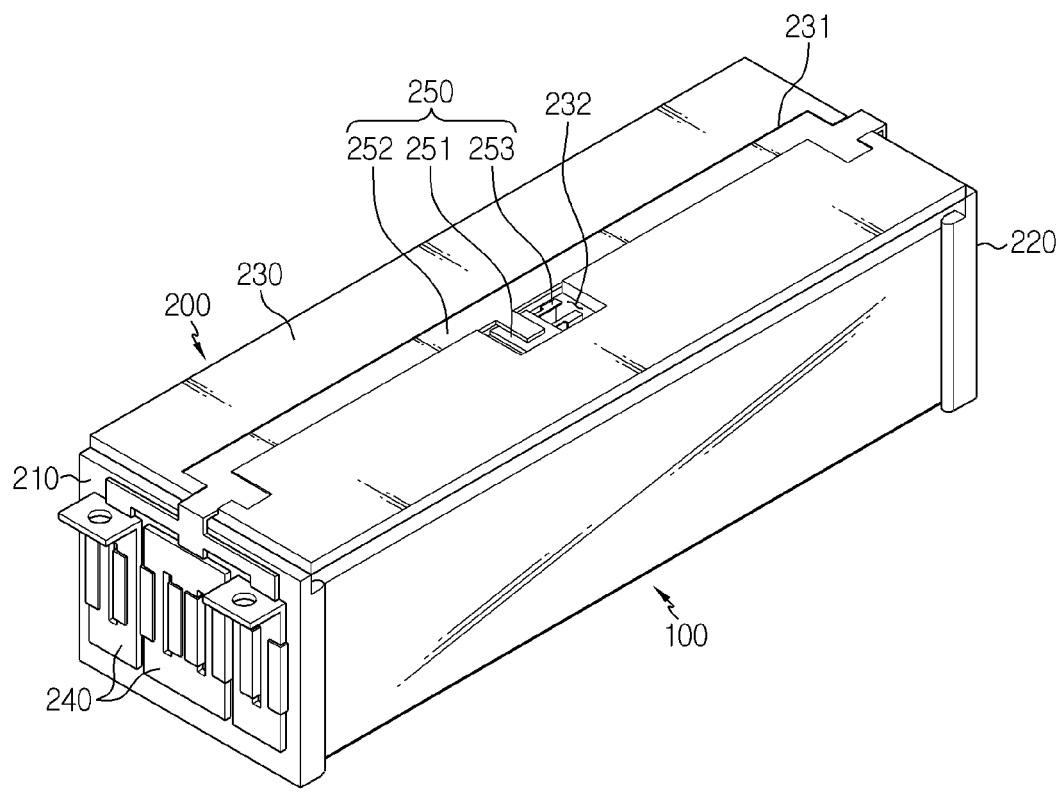
FIG. 1 is a perspective view schematically showing a cell stack and a bus bar frame according to an embodiment of the present disclosure, which are assembled to each other.
Figure 2:
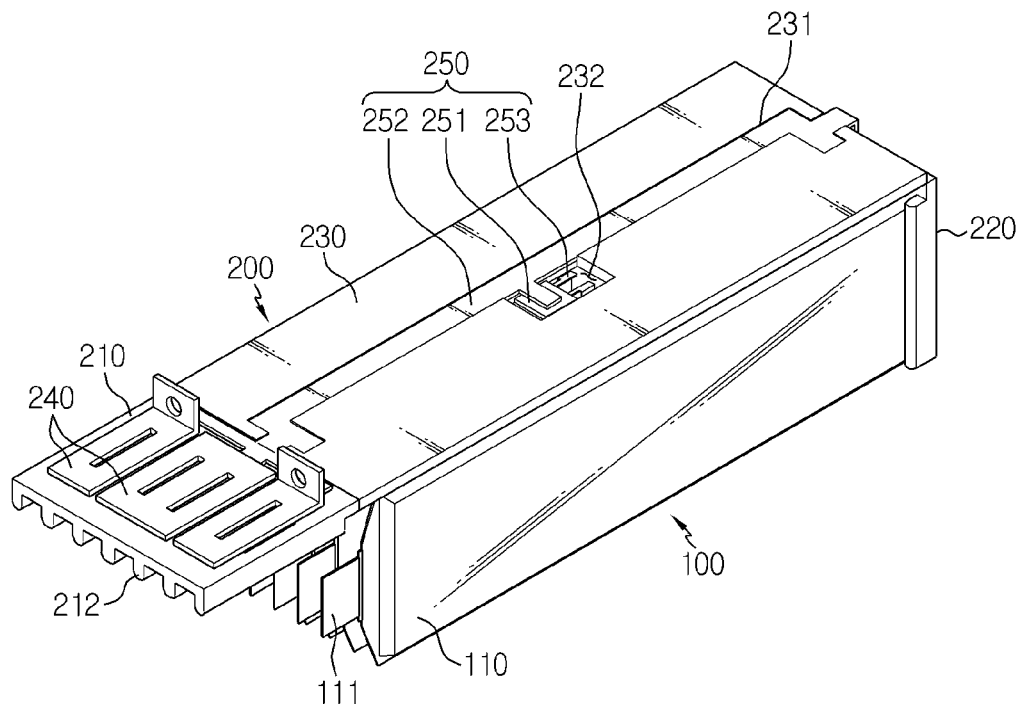
FIG. 2 is a perspective view showing that a first vertical plate of the bus bar frame of FIG. 1 is opened.

FIG. 1 is a perspective view schematically showing a cell stack and a bus bar frame according to an embodiment of the present disclosure, which are assembled to each other, and FIG. 2 is a perspective view showing that a first vertical plate of the bus bar frame of FIG. 1 is opened.

Referring to the figures, a battery module according to an embodiment of the present disclosure includes a cell stack 100, a bus bar frame 200, and a mono-frame 300.

First, the cell stack 100 will be described. The cell stack 100 may be a collection of a plurality of battery cells 110. Here, the battery cell 110 is a pouch-type secondary battery, and though not shown in detail, the battery cell 110 is a bi-directional pouch-type secondary battery in which a positive electrode lead and a negative electrode lead protrude in opposite directions.

The pouch-type secondary battery may include an electrode assembly, an electrolyte and a pouch exterior. The pouch exterior may include two pouches, and a concave inner space may be formed in at least one of the two pouches. In addition, the electrode assembly may be accommodated in the inner space of the pouch. Sealing portions are provided at outer circumferences of the two pouches, and the sealing portions are welded to each other so that the inner space accommodating the electrode assembly may be sealed. The electrode lead 111 may be attached to the electrode assembly, and the electrode lead 111 may be disposed between the sealing portions of the pouch exterior and exposed out of the pouch exterior to function as an electrode terminal of the secondary battery.

The pouch-type secondary battery cells are stacked in a lateral direction in a state of standing vertically as shown in FIG. 2, thereby forming the cell stack 100. The surfaces on which the electrode leads 111 of the secondary battery cells 110 protrude are defined as a front surface and a rear surface of the cell stack 100.

The bus bar frame 200 is a frame capable of fixing the bus bar 240 and a terminal or the like and made of an insulating material. The bus bar frame 200 includes a first vertical plate 210, a second vertical plate 220, and an upper plate 230 connected to upper portions of the first vertical plate 210 and the second vertical plate. The first vertical plate 210 and the second vertical plate 220 may be disposed at the front surface and the rear surface of the cell stack 100, respectively, and the upper plate 230 is disposed at an upper portion of the cell stack 100.

A plurality of bus bars 240 may be provided to the outer surfaces of the first vertical plate 210 and the second vertical plate 220. For example, the plurality of bus bars 240 may be mounted to the first vertical plate 210 and the second vertical plate 220 in a snap-fitting manner. The individual battery cells 110 of the cell stack 100 may extend outwardly through slots (not shown) formed at predetermined positions of the first vertical plate 210 and the second vertical plate 220, and one end of the individual battery cells 110 may be attached to the corresponding bus bars 240 by an ultrasonic welding method or the like.

The first vertical plate 210 and the second vertical plate 220 may have assembling guide units 212 convexly formed in a predetermined pattern at inner surfaces thereof. The assembling guide units 212 may be arranged at regular intervals in the lateral direction, which is identical to the stacking direction of the individual battery cells 110. Bodies of the individual battery cells 110 may be supported by the assembling guide units 212, and the electrode leads 111 of the individual battery cells 110 may be guided between the assembling guide units 212 to extend out of the first vertical plate 210 or the second vertical plate 220 through the slots (not shown) of the first vertical plate 210 or the second vertical plate 220.

The upper plate 230 may be connected to the first and second vertical plates 210, 220 to cover the upper portion of the cell stack 100. A sensing member 250 is disposed at the upper plate 230 along a predetermined path. The sensing member 250 may include a circuit board 251 and a cable 252.

The circuit board 251 may include a BMS processor chip for sensing the voltage of the individual battery cells 110 and uniformly controlling the voltages of the individual battery cells 110.

The cable 252 is connected to the bus bars 240 of the first vertical plate 210 and the bus bars 240 of the second vertical plate 220 and connected to the circuit board 251 to transmit the voltage information of the individual battery cells 110 to the BMS processor chip. The cable 252 may adopt a flexible printed circuit (FPC) or a flexible fat cable (FFC), which is advantageous for increasing the space utilization and preventing the risk of short circuit between conductors.

Figure 3:
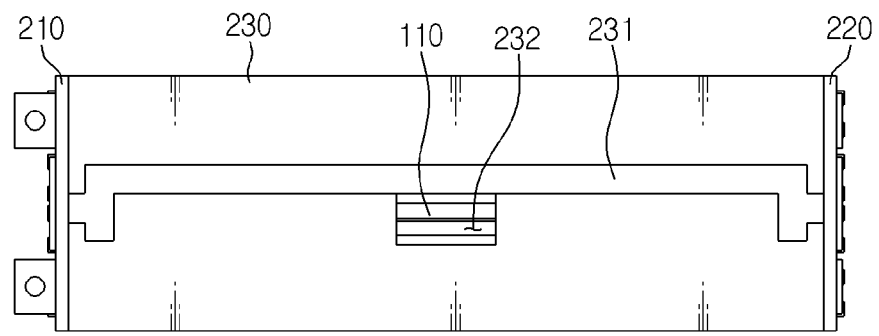
FIG. 3 is a plane view showing an upper plate of the bus bar frame of FIG. 1 from which a sensing member is excluded.
Figure 4:
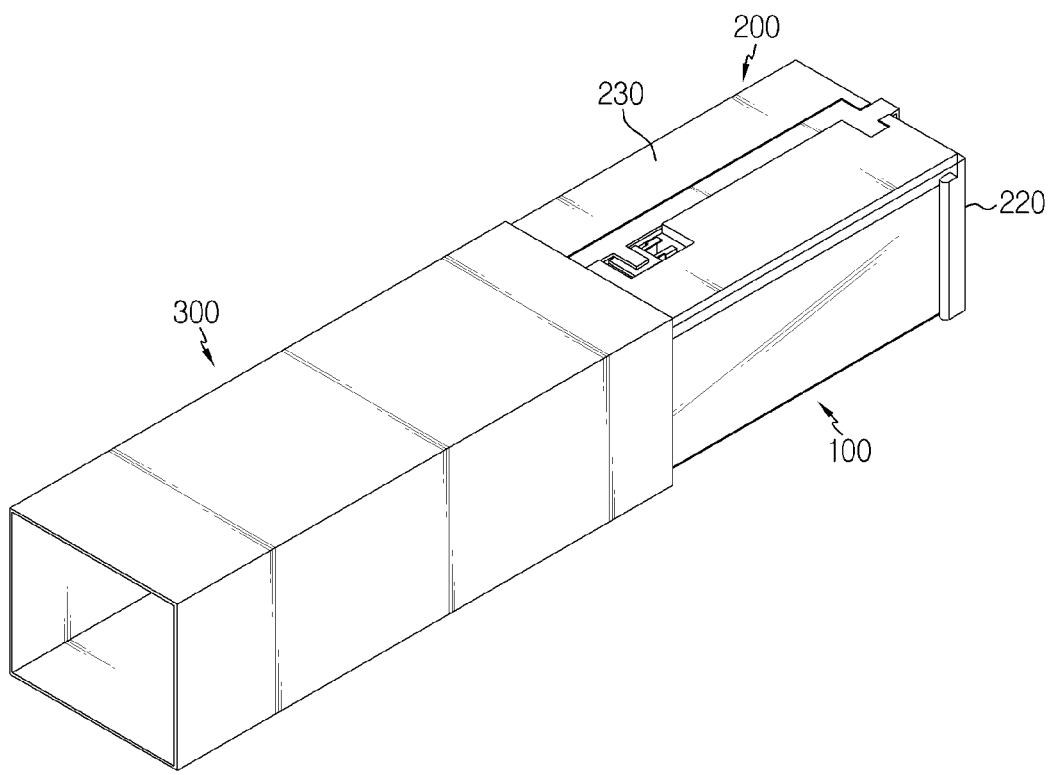
FIG. 4 is a perspective view for illustrating a process of assembling the mono-frame with the cell stack and the bus bar frame, which are assembled to each other, according to an embodiment of the present disclosure.

As shown in FIGS. 2 and 3, the upper plate 230 has a cable wiring groove 231 concavely formed at a surface thereof, corresponding to the width and thickness of the cable 252 along a wiring path of the cable 252. The cable 252 may be attached to the upper plate 230 in a state of being embedded in the cable wiring groove 231. Since the cable 252 is embedded and fixed in the cable wiring groove 231 not to be exposed above the upper plate 230, it is possible to eliminate the risk of damaging the cable 252 in the assembling process in which the cell stack 100 and the bus bar frame 200 are assembled and then inserted into the mono-frame 300 as shown in FIG. 4.

In addition, the upper plate 230 may further have an opening 232 formed vertically therethrough at a location adjacent to the cable wiring groove 231. The circuit board 251 may be positioned within the opening 232. Also, the opening 232 may be utilized as a space for installing the thermistor 253 for measuring temperature of the battery cells 110. For example, one end of the thermistor 253 may be connected to the circuit board 251, and the other end of the thermistor 253 may be interposed between the battery cells 110 below the opening 232.

The bus bar frame 200 including the first vertical plate 210, the second vertical plate 220 and the upper plate 230 as described above has a size corresponding to the length and width of the cell stack 100 with a substantially "⊂" shape, and the bus bar frame 200 is ideally assembled to the cell stack 100 in a compact manner. However, if the dimension of the bus bar frame 200 having the "⊂" shape is minimized so that the assembly tolerance between the bus bar frame 200 and the cell stack 100 is minimized, the electrode leads 111 of the cell stack 100 may not be easily assembled with the bus bars 240 on the bus bar frame 200.

Thus, in the bus bar frame 200 according to the present disclosure, the first vertical plate 210 and the second vertical plate 220 are coupled to the upper plate 230 by a hinge 215 so as to be rotatable in a clockwise direction and in a counterclockwise direction with respect to both ends of the upper plate 230. According to the configuration of the bus bar frame 200, the electrode leads 111 protruding in opposite directions may be easily attached to the bus bars 240 on the first vertical plate 210 and the second vertical plate 220.

In other words, when the bus bar frame 200 is assembled to the cell stack 100, ends of the electrode leads 111 are inserted into the slots of the first vertical plate 210 and the second vertical plate 220, and then bent and welded to the surface of the corresponding bus bar 240 by ultrasonic welding. At this time, if the first vertical plate 210 and the second vertical plate 220 are placed to cover the cell stack 100 in state of keeping a right angle to the upper plate 230, it is difficult to secure a sufficient space where the electrode leads 111 of the cell stack 100 are inserted into the slots of the first and second vertical plates 210, 220, and the electrode leads 111 may be highly likely to be damaged during the assembling process.

Thus, as shown in FIG. 2, in a state where the first vertical plate 210 is rotated in a clockwise direction to be opened, first, the electrode leads 111 located at one side of the cell stack 100 are inserted into the slots of the second vertical plate 220, and then the first vertical plate 210 is rotated in a counterclockwise direction so that the electrode leads 111 located at the other side of the cell stack 100 are inserted into the slots of the first vertical plate 210. After that, the electrode leads 111 are bent to come into contact with the surfaces of the corresponding bus bars 240, and ultrasonic welding is performed to fix the electrode leads 111 to the bus bars 240. According to the configuration and assembly method of the bus bar frame 200, the bus bar frame 200 and the cell stack 100 may be tightly assembled, and there is little possibility that the electrode leads 111 are damaged during the assembling process.

In this embodiment, it has been described that the first vertical plate 210 and the second vertical plate 220 are hinged to the upper plate 230, but the scope of the present disclosure is not limited thereto. That is, it is also possible that only one of the first vertical plate 210 and the second vertical plate 220 is coupled to the upper plate 230 by the hinge 215. Even in this case, it is not difficult to assemble the bus bar frame 200 to the cell stack 100.

The conventional battery module uses a plurality of end plates, which are prepared to be assembled in a bolting or hooking manner as an outer frame for protecting the cell stack 100. The outer frame may be understood as a component of the battery module that provides mechanical support to the cell stack 100 and protects the cell stack 100 from external impacts.

The battery module according to the present disclosure uses the mono-frame 300 to serve as the outer frame. The mono-frame 300 has a hollow structure and may be formed in a rectangular tube shape by extrusion or die casting.

The cell stack 100 and the bus bar frame 200 assembled with each other may be inserted into the mono-frame 300, as shown in FIG. 4. (Hereinafter, the cell stack 100 and the bus bar frame 200 assembled with each other will be collectively referred to as a bus bar frame assembly.) The mono-frame 300 and the bus bar frame assembly are assembled substantially in a fitting manner. The dimensions of the mono-frame 300 and the bus bar frame assembly are preferably selected to minimize the assembly tolerance so that the energy density is maximized. Thus, the mono-frame 300 may be designed such that the height and width of its inner space nearly equal to the overall height and width of the bus bar frame assembly.

In this case, the energy density may be advantageously maximized, but the assembly tolerance between the mono-frame 300 and the bus bar frame assembly becomes very tight, which makes the assembling work difficult. Thus, it is very important to manage the assembly tolerance between the mono-frame 300 and the bus bar frame assembly.

For the management of the assembly tolerance, the bus bar frame 200 of the present disclosure may further include a stopper 211, which prevents the first vertical plate 210 and the second vertical plate 220 from being excessively rotated with respect to the upper plate 230 to prohibit the overall height of the bus bar frame assembly from increasing, and thus secures a margin gap as much.

Figure 5:
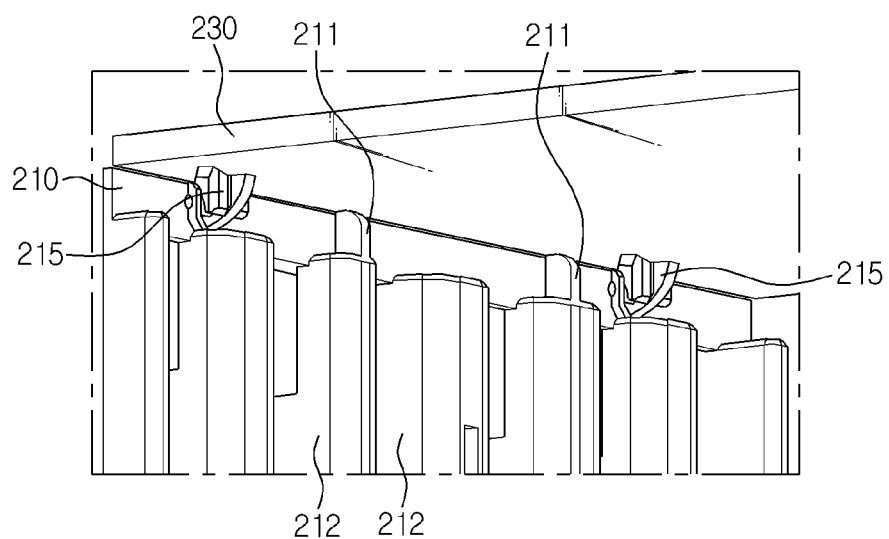
FIG. 5 is a partial perspective view showing main components inside the bus bar frame according to an embodiment of the present disclosure.

Specifically, as shown in FIG. 5, the stopper 211 protrudes on the inner surface of the first vertical plate 210 toward the cell stack 100. When the first vertical plate 210 and the second vertical plate 220 make a right angle to the upper plate 230, the stopper 211 may contact the lower surface of the upper plate 230. Since the inner surfaces of the first vertical plate 210 and the second vertical plate 220 have substantially the same structure, the first vertical plate 210 will be explained in detail, and the second vertical plate 220 will not be explained in detail.

One end of the upper plate 230 and the first vertical plate 210 may be connected to two hinges 215 spaced apart from each other by a predetermined distance, and the other end of the upper plate 230 and the second vertical plate 220 may also be connected to two hinges 215 spaced apart from each other by a predetermined distance. The stopper 211 may be positioned between the two hinges 215 and provided in the form of at least one rectangular plate with a predetermined thickness. Here, the upper surface of the stopper 211 has the same height as the upper end surface of the first vertical plate 210. When the first vertical plate 210 makes a right angle to the upper plate 230, the upper surface of the stopper 211 contacts the lower surface of the upper plate 230 to prevent the first vertical plate 210 from rotating.

Two stoppers 211 may be provided and may be integrally formed with the assembling guide unit 212 at the upper portion of the assembling guide unit 212. The first and second vertical plates 210, 220 may be fabricated through injection molding, and the design change of the mold for injection molding may be minimized by integrating the stoppers 211 with the assembling guide unit 212 as in this embodiment. This embodiment is to maximize the effect using a smallest number of stoppers 211 by placing two action points of the stopper 211 between the two hinges 215. However, unlike this embodiment, the shape or number of the stoppers 211 may be changed as long as the stoppers 211 are capable of preventing the rotation of the first and second vertical plates 210, 220.

Figure 6:
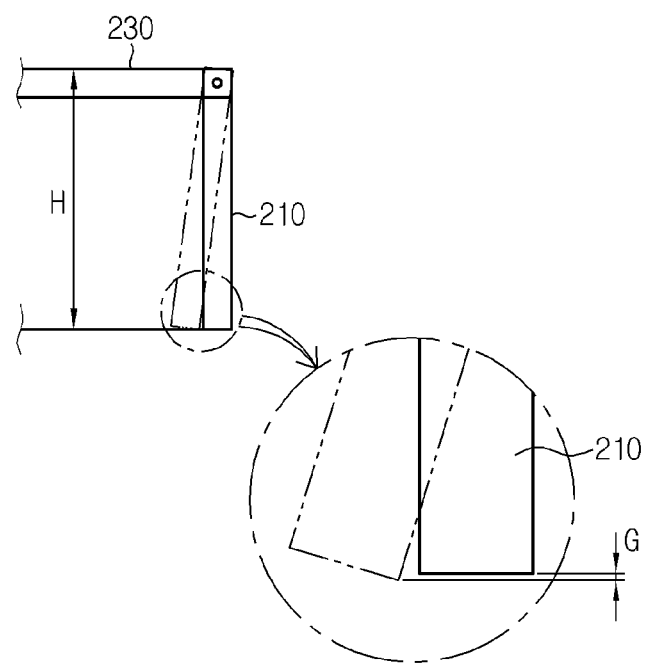
FIG. 6 is a reference view for illustrating the function of a stopper of the bus bar frame according to an embodiment of the present disclosure.

Referring to FIG. 6, the role of the stopper 211 will be further explained. If there is no stopper 211 as shown in FIG. 6, even though the hinge 215 capable of restricting the rotation of the first vertical plate 210 to an angle of 90 degrees with respect to the upper plate 230 is applied, an error may occur around 90 degrees. Also, since the pouch-type secondary battery cells 110 are soft components, it is impossible to restrict the rotation of the first vertical plate 210.

Thus, the first vertical plate 210 may be rotated finely more than the 90 degrees with respect to the upper plate 230. If the first vertical plate 210 at this time is compared with the first vertical plate 210 at 90 degrees, the lower end of the first vertical plate 210 at this time is further lowered than the first vertical plate 210 at 90 degrees as much as the gap G shown in FIG. 6. In this case, the overall height H of the bus bar frame 200 is increased as much as the gap G. The increase of the overall height H of the bus bar frame 200 may inevitably affect adversely the assembling work, even if it is fine, since the assembly tolerance between the bus bar frame assembly and the mono-frame 300 is very small.

Meanwhile, in the bus bar frame 200 having the stopper 211, the first vertical plate 210 and the second vertical plate 220 are not rotated over 90 degrees with respect to the upper plate 230. Thus, it is possible to prevent that the overall height H of the bus bar frame 200 increases as described above, and the margin gap G may be secured as much. As a result, the function of the stopper 211 may lead to increased energy density of the battery module or surplus assembly tolerance during the assembling process of the mono-frame 300 and the bus bar frame assembly.

Meanwhile, a battery pack according to the present disclosure may include one or more battery modules of the present disclosure. In addition, the battery pack may further include a case for covering the battery module, various devices for controlling charge and discharge of the battery module, a current sensor, a fuse, and the like, in addition to the battery module.

The battery pack according to the present disclosure may be applied to an electric vehicle, a hybrid electric vehicle, a power storage device or the like. That is, the vehicle according to the present disclosure may include the battery pack of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery module, comprising:
   a cell stack including stacked pouch-type secondary battery cells, which have electrode leads in opposite directions;

a bus bar frame having first and second vertical plates respectively disposed at side surfaces of the cell stack corresponding to locations of the electrode leads of the cells and an upper plate connected to the first and second vertical plates and disposed at an upper portion of the cell stack to be hinged to at least one of the first and second vertical plates; and a mono-frame having a rectangular tube shape with an inner space in which the cell stack mounted to the bus bar frame is inserted and disposed, wherein a plurality of bus bars are provided at outer surfaces of the first and second vertical plates, and the electrode leads of the cells are electrically connected to the corresponding bus bars through slots formed in the first and second vertical plates, wherein a sensing member electrically connected to the bus bars of the first and second vertical plates to sense electrical characteristics of the cells is disposed at the upper plate, and wherein the bus bar frame has stoppers formed at inner surfaces of the first vertical plate and the second vertical plate to protrude toward the cell stack, so that the stoppers come into contact with a lower surface of the upper plate when the bus bar frame makes a right angle with the upper plate to prevent the respective vertical plate from being rotated over 90 degrees with respect to the upper plate.

2. The battery module according to claim 1,
wherein one end of the upper plate is connected to the first vertical plate by two hinges, and another end of the upper plate is connected to the second vertical plate by two hinges, and
wherein each stopper is provided in the form of at least one rectangular plate located between the two hinges of the respective vertical plate.

3. The battery module according to claim 1,
wherein the first vertical plate and the second vertical plate respectively include assembling guide units convexly formed at an inner surface thereof at regular intervals along a stacking direction of the battery cells and extending along a height direction of the respective vertical plate.

4. The battery module according to claim 3,
wherein each stopper is integrally formed with at least one of the assembling guide units of the respective vertical plate.

5. The battery module according to claim 1,
wherein the sensing member includes a circuit board, and a cable for connecting the bus bars and the circuit board.

6. The battery module according to claim 5,
wherein the upper plate has a cable wiring groove concavely formed at a surface thereof to correspond to a width and a thickness of the cable along a wiring path of the cable.

7. The battery module according to claim 6,
wherein the upper plate has an opening vertically formed therethrough at a location adjacent to the cable wiring groove.

8. A battery pack, comprising the battery module according to claim 1.

9. A vehicle, comprising the battery pack according to claim 8.

10. The battery module according to claim 5,
wherein the cable is a flexible printed circuit or a flexible fat cable.

11. The battery module according to claim 1,
wherein the upper plate is hingedly connected to only one of the first vertical plate and the second vertical plate.

12. The battery module according to claim 1,
wherein the first vertical plate and the second vertical plate respectively include convex assembling guide units extending along a height direction of the respective vertical plate at an inner surface thereof at regular intervals along a stacking direction of the battery cells, and
wherein each stopper is at least one rectangular plate integrally formed with at least one of the assembling guide units of the respective vertical plate.

* * * * *